United States Patent [19]

Tsunekawa et al.

[11] Patent Number: 4,687,914
[45] Date of Patent: Aug. 18, 1987

[54] DISTANCE MEASURING DEVICE COMPRISING A TWO SECTIONED SENSOR, EACH SECTION HAVING A PLURALITY OF SENSING AREAS

[75] Inventors: Tokuichi Tsunekawa; Yuichi Sato; Takashi Kawabata; Susumu Matsumura, all of Kanagawa, Japan

[73] Assignee: Canon Kabushiki Kaisha

[21] Appl. No.: 595,271

[22] Filed: Mar. 30, 1984

[30] Foreign Application Priority Data

Apr. 1, 1983 [JP] Japan ............................. 58-57204
Apr. 1, 1983 [JP] Japan ............................. 58-57210

[51] Int. Cl.$^4$ .......................... G01J 1/20; G01J 1/28
[52] U.S. Cl. ................................. 250/201; 250/204; 354/403; 356/4; 356/1
[58] Field of Search ........... 250/201 AF, 201 DF, 250/204, 214 B; 354/403; 356/4, 1

[56] References Cited
U.S. PATENT DOCUMENTS

| | | |
|---|---|---|
| 4,274,735 | 6/1981 | Tamura et al. ..................... 354/403 |
| 4,315,159 | 2/1982 | Niwa et al. ....................... 250/214 B |
| 4,373,791 | 2/1983 | Araki ..................... 250/201 |
| 4,477,168 | 10/1984 | Hosoe ..................... 354/403 |
| 4,521,106 | 6/1985 | Lambeth ..................... 354/403 |
| 4,522,492 | 6/1985 | Masunaga ..................... 250/201 |
| 4,529,304 | 7/1985 | Ogawa et al. ..................... 354/403 |

Primary Examiner—Edward P. Westin
Assistant Examiner—Charles F. Wiedland
Attorney, Agent, or Firm—Toren, McGeady & Associates

[57] ABSTRACT

In the disclosed distance measuring device a light source projects a light on an object to be photographed and at least two photo-electric converters each with several light receiving areas receive light reflected by the object. The quantity of electric charge on these areas varies with the quantity of light incident thereon. An electric charge storage stores the electric charges produced at the two converters and a control determines the operation of the light receiving areas of the photo-electric converters according to the electric charge information produced.

8 Claims, 15 Drawing Figures

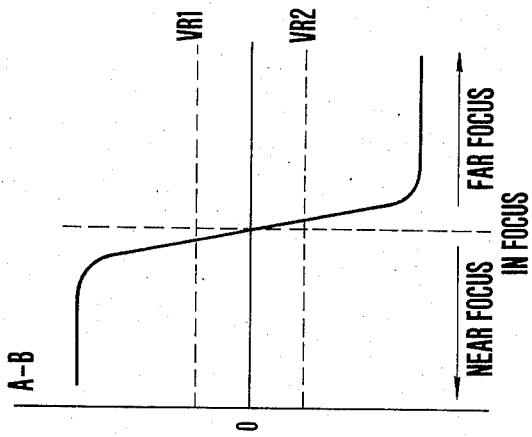
FIG.5(c)
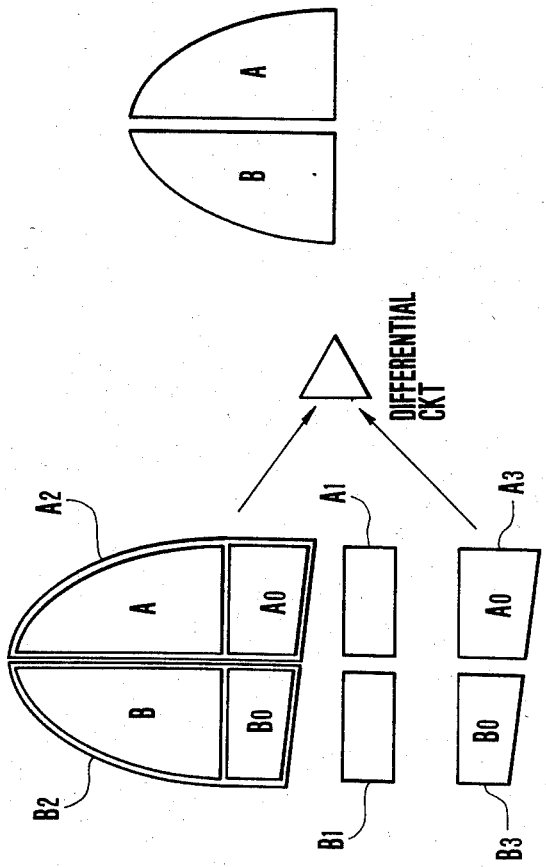
FIG.5(b)
FIG.5(a)

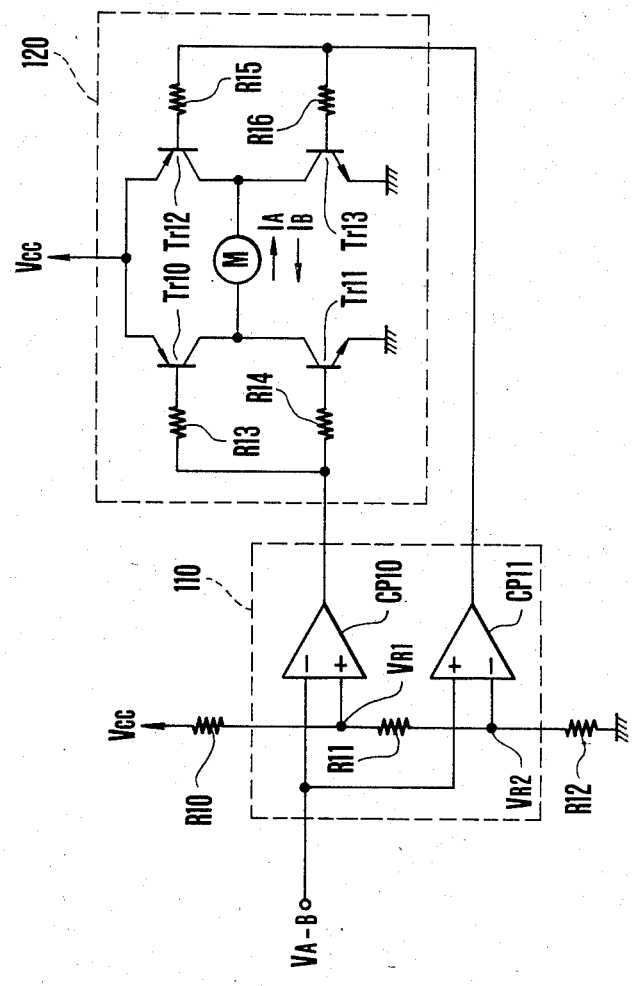
F I G. 7B

DISTANCE MEASURING DEVICE COMPRISING A TWO SECTIONED SENSOR, EACH SECTION HAVING A PLURALITY OF SENSING AREAS

BACKGROUND OF THE INVENTION

1. Field of the Invention

This invention relates to a distance measuring device for a camera in which a distance measuring light beam is projected on an object (such as a photographic object) whose distance is to be measured, photo-sensitive elements receive light from the object and store electric charges converted from the incident light, the stored quantity of electric charges is detected and a lens is focused on the basis of the electric charge. More particularly, the invention relates to a light receiving arrangement for the distance measuring device.

2. Description of the Prior Art

An example of the photo-sensitive element of the aforesaid electric charge storing type is disclosed in U.S. Pat. No. 3,999,192. Here an electric-charge-storing photo-decoder includes sensors which receive reflected light, as well as a first and second electric charge storages each with two electric-charge-storing element. The photo-detector operates in response to a light projector which projects light through given on-off cycles. First and second control gates are controlled in time with the intermittent cycles of the projected light. Electric charges generated at the sensors when light is projected, and during the intermittent intervals, are then separately stored in corresponding electric charge storing elements of the first and second electric charge storages. The electric charges thus stored at the first and second electric charge storages are drawn out at suitable respective times. In this instance, the pairs of electric charge storing elements in the first and second electric charge storages of corresponding sensors produce electric signals according to the electric charges stored therein. Two differential amplifiers generate the respective differences between these electric signals. The system then detects concordance or discordance between the outputs of the two differential amplifiers and shifts the position of a focusing lens to a focused position on the basis of the detected signal.

With two photo-sensitive elements at a photographic camera producing signals from their photo-electric converters, the differential amplifiers compute and determine the extent to which the focusing lens should be shifted to an in-focus position. Accordingly, the focusing lens can be shifted and stopped at the in-focus point. However, using such differential type amplifiers in a light receiving device requires each of the gates in the light receiving device to be controlled with a high degree of accuracy.

A first subject of the present invention concerns a drive control for a light receiving device using these kinds of differential type amplifiers. A second subject of the invention involves overcoming problems concerning the relationship of the photo-taking lens to a light receiving device of the aforementioned differential amplifier adapted for use in a photographic camera as a focusing device. FIGS. 1-4 of the accompanying drawings illustrate the problems of this second subject.

FIGS. 1 to 4 include an image-forming lens 1 and a light source 3. Light from the light source 3 is projected onto a photographic object 2 through a light projecting lens 4 and the image forming lens 1. The lens 4 and a light receiving lens 5 guide light reflected from the object 2 to photo-electric converting means 6. Photo-electric converting means 6 includes two photo-electric converting elements 6a and 6b. A distance to the object is detected when the two photo-electric converting elements 6a and 6b receive the light reflected from the object 2 equally.

The lens 1 may, for example, form an image of the object to be photographed on a film surface. When an object comes closer, such as to a point 7 as shown in FIG. 2, the resulting focus deviation is mainly toward the element 6b. That is, the image of a spot of light projected onto the object by the lens 1 and returned by the light receiving lens 5 follows the path of the light flux 8. As a result, the photo-electric converting elements 6a and 6b receive different quantities of light. Detection of this difference then indicates that the object is located nearer than an expected object plane. The lens 1 is then shifted toward an in-focus condition.

However, with the position of an object changed, the light striking the photo-electric converting elements 6a and 6b does not always change in exact proportion to the change of the object position. For example, in a zoom lens such as the one shown in FIGS. 3(a) and 3(b), the photo-electric converting means 6 operates correctly when the lens is zoomed to its telephoto end as shown in FIG. 3(a). This is so because the projected light ray 10 does not cross the main received light ray 11 nor a light ray 12 coming to the end of the photo-electric converting means within the lens system of the zoom lens. However, in the case of FIG. 3(b) where the lens is zoomed to its wide angle end, the projected light ray 10 overlaps a light ray 12 at a light receiving end of a lens section 13. The internal reflection by the lens face at the section 13 causes the light to return to the end portion of the photo-sensitive element. The latter does not discriminate internally reflected light from light reflected by the object. This tends to result in an erroneous operation.

Similar inconveniences sometimes arise depending on the object distance or due to shifts in the operation of the focusing lens. Attempts to prevent this by making the light receiving surface of the photo-electric converting means 6 smaller can result in another disadvantage. The reflected light may depart from the light receiving area if the reflected light deviates to any great extent when the lens is zoomed to its telephoto position.

In detecting the difference signal from the paired photo-electric converting elements, increasing the light receiving area enables detection of the signal despite a large deviation. However, the arrangement degrades the deviation detecting accuracy for a delicate change of the light flux near an in-focus point.

FIG. 4 shows an example of the conventional circuit using photo-electric converting elements. This conventional arrangement includes photo-electric converting elements 21 and 22 which correspond to the photo-electric converting elements 6a and 6b and gates 23 and 24 for reading out two photo-electric signals produced by these photo-electric converting elements. These gates are operated via a line 25. The photo-electric conversion values of the elements 21 and 22 are applied to lines 28 and 29 in parallel with additional charges or stored charges 26 and 27. Then, a voltage or electric charge difference between these two lines represents the deviation of the reflected light.

SUMMARY OF THE INVENTION

An object of the present invention is to provide a distance measuring device having differential type light receiving means including a photo-sensitive element for photo-electric conversion of light reflected from an object whose distance is to be measured, wherein the photo-sensitive element has first and second photo-electric converting parts; the photo-electric converting parts each have a plurality of light receiving areas; the inside light receiving area is arranged to receive mainly light reflected by the object as a result of light projected by light emitting means when the object stays near the in-focus position; the outside light receiving area is arranged to receive mainly light reflected by the object when the object departs from the in-focus position; and an accurate distance measurement is effected by selecting these light receiving areas in accordance with the various types of information available.

Another object of the invention is to provide a distance measuring device having light receiving means including the pair of photo-sensitive elements, wherein each of the photo-sensitive elements is provided with photo-electric converting parts having a plurality of light receiving areas and electric charge storing parts arranged to store electric charges produced from the photo-electric converting parts; an electric charge transfer gate is provided between each of the photo-electric converting parts and the electric charge storing part; whether or not a focusing lens is close to an in-focus position is determined through a signal light striking the photo-electric converting parts of the pair of photo-sensitive elements on the basis of a signal produced by the electric charge storing part; the electric charge transfer gate or integration clearing gate is controlled according to the position of the focusing lens thus determined; when the focusing lens is close to the in-focus position, the electric charge transfer gate or integration clearing gate is controlled such as to actuate only the photo-electric converting part that is arranged to receive reflected light resulting from light projected by light emitting means; and distance measurement is thus accurately accomplished.

A further object of the invention is to solve the problem of conventional light receiving devices using the differential type amplifiers mentioned in the foregoing description of the prior art. This involves the following arrangement: A differential type of light receiving device having a wide area light receiving portion for receiving light projected by light emitting means and reflected by the object and for photo-electrically converting the light received stores the produced electric charge not only when the object nears the focused position but also away from the focused position. The operations of the light receiving portions are controlled according to the characteristics of the optical system of a photo-taking lens, such as the lens position, maximum aperture F-number, zoom ratio, etc. so that the light receiving portions are selectively used for improving the accuracy of the distance measurement.

These and further objects and features of the invention will become apparent from the following detailed description of preferred embodiments thereof taken in connection with the accompanying drawings.

BRIEF DESCRIPTION OF THE DRAWINGS

FIGS. 5(a)–8 illustrate a first embodiment of the present invention. Of these drawings, FIGS. 5(a), 5(b) and 5(c) are illustrations of storage type photo-electric converting means used for a differential type light receiving device arranged according to the invention.

FIG. 6 is a diagram showing photo-electric converting means arranged according to the invention.

FIG. 7B is a circuit diagram showing control circuit.

FIG. 8 is a timing chart showing the operation of the essential parts of FIG. 7A.

FIGS. 9 and 10 are circuit diagrams showing the differential type light receiving devices of the embodiment, FIG. 9 showing a CCD type device and FIG. 10 a photo transistor type device respectively. FIG. 11 is a circuit diagram showing arrangement to automatically drive the light receiving devices of FIGS. 9 and 10.

DETAILED DESCRIPTION OF THE PREFERRED EMBODIMENTS

A first embodiment of the present invention is shown in FIGS. 5(a)–8. Of these drawings, FIGS. 5(a), 5(b) and 5(c) show photo-electric converting means of the storage type arranged according to the invention. FIG. 5(a) shows conceptually, the electric charges A and B generated at two photo-electric converting parts A1 and B1 by a light reflected by a photographing object when a light is projected by a light source and other electric charges A0 and B0 which are generated by an ambient light when the light is not projected. The sums of the amounts of electric charges A+A0 and B+B0 are supplied by the photo-electric converting parts A1 and B1 to first and second electric charge storing parts A2 and B2 to be stored there respectively. At the same time, the electric charges A0 and B0 generated at the photo-electric converting parts A1 and B1 when the light is not projected are stored respectively at third and fourth electric charge storing parts A3 and B3. Then, differences between these stored electric charges are obtained by a differential circuit. This detects the amounts A and B of the electric charges representing only the reflected light component resulting from the projected light as shown in FIG. 5(b).

In FIG. 5(c), the lens system used for distance measurement is considered to be in an in-focus position when the two electric charge amounts A and B are equal to each other; to be in a near-focus position when they are in a relation of A>B; and to be in a far-focus position when they are in a relation of A<B. In this instance, if the electric charge amount A+B is arranged to be kept at a constant value, a slant in the proximity of the in-focus position of A−B becomes almost unvarying. This keeps the focusing accuracy unvarying.

Figure 1:
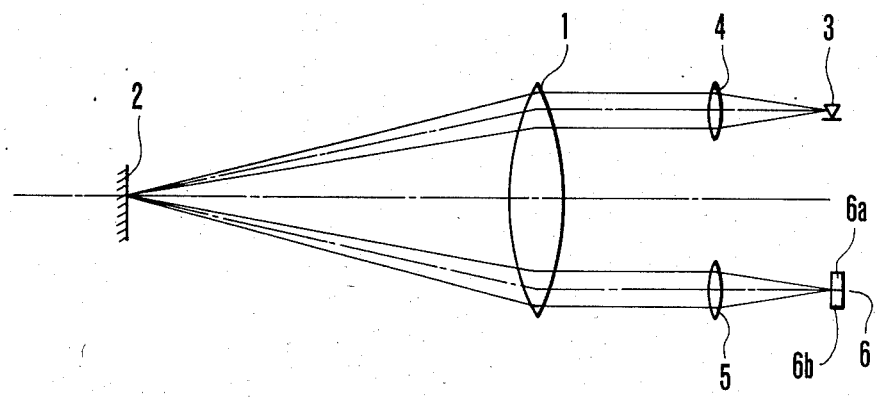
FIGS. 1 and 2 are schematic illustrations of the conventional distance measuring device.
Figure 2:
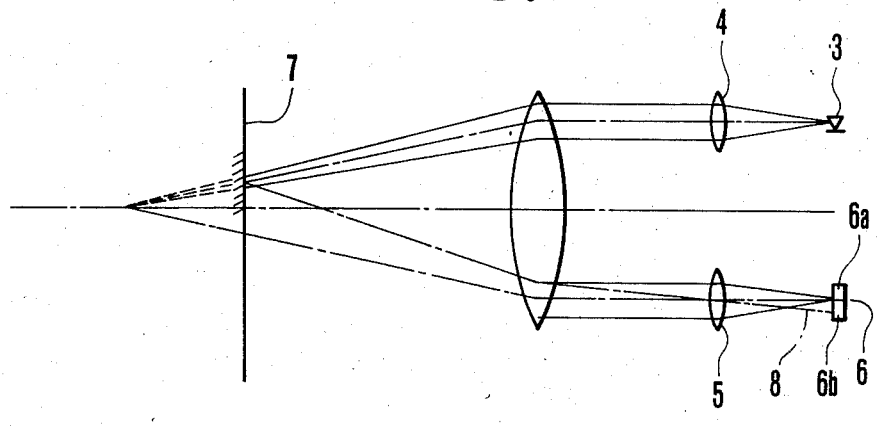
Figure 3A:
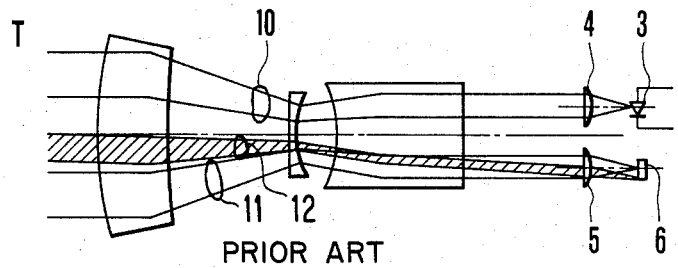
FIGS. 3(a) and 3(b) are schematic illustrations showing the conventional distance measuring device as in a state of being applied to a zoom lens.
Figure 3B:
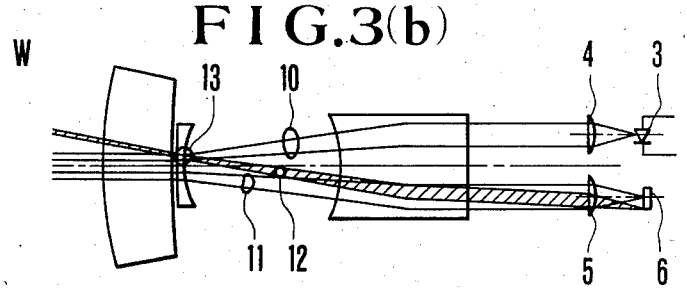
Figure 4:
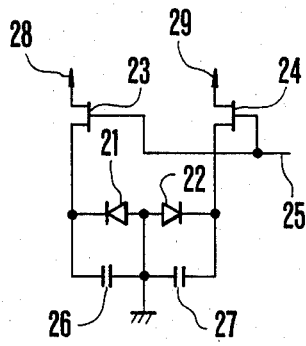
FIG. 4 is a circuit diagram showing an example of the conventional photo-electric converting means.
Figure 6:
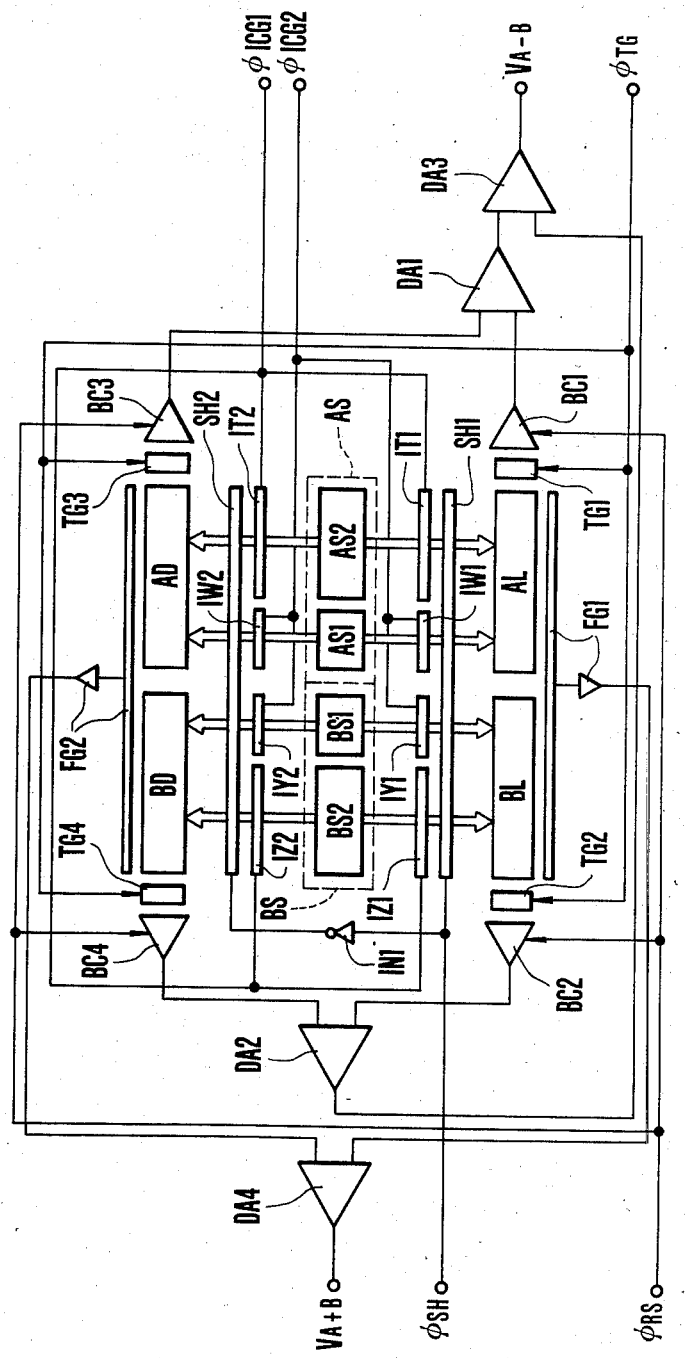

FIG. 6 shows one embodiment of the differential type light receiving device usable in accordance with the invention. The device includes photo-sensitive elements, one consisting of light receiving areas AS1 and AS2 and the other consisting of light receiving areas BS1 and BS2. The light receiving areas AS1 and AS2 constitute a first photo-electric converting part and the light receiving areas BS1 and BS2 a second photo-electric converting part. In this specific embodiment, each photo-electric converting part is arranged to have two light receiving areas. However, each of them of course may be arranged to have more than two light receiving areas. First and second electric charge storing parts AL and BL are arranged to store the sum of a reflection resulting from light projected by light emitting means and a reflection resulting from an ambient light when the light is projected; third and fourth electric charge storing parts AD and BD which are arranged to store the ambient light received when no light is projected. Integration clearing gates IW1, IW2, IY1 and IY2 arranged to clear the electric charges produced by the photo-electric converting parts AS1 and BS1 when a signal $\phi$ICG2 is at a high level. Integration clearing gates IT1, IT2, IZ1 and IZ2 served to clear the electric charges produced by the photo-electric converting parts AS2 and BS2 when a signal $\phi$ICG1 is at a high level. Electric charge transfer gates SH1 and SH2 allow the electric charges produced by the light receiving areas AS1, AS2, BS1 and BS2 of the photo-electric converting part to be stored at the electric charge storing parts AL and BL when signals $\phi$CG1 and $\phi$CG2 are at a low level and a signal $\phi$SH is at a high level and allow the electric charges produced by the light receiving areas AS1, AS2, BS1 and BS2 of the photo-electric converting parts to be stored at the electric charge storing parts AD and BD when the signal $\phi$SH is at a low level and the electric charge transfer gate SH2 becomes high through an inverter IN1. Electric charge transfer gates TG1-TG4 are arranged to transfer the electric charges stored at the electric charge storing parts to electric charge-to-voltage converting parts BC1-BC4 when a signal $\phi$TG is at a high level and a signal read-out operation is thus performed. The converting part BC1 is arranged to produce the signal A+A0, the converting part BC2 to produce the signal B+B0, the converting part BC3 to produce the signal A0 and the converting part BC4 to produce the signal B0. Then, a signal $(A+A0)-(A0)=A$ is produced via a differential amplifier circuit DA1, a signal $(B+B0)-(B0)=B$ via a differential amplifier circuit DA2 and a signal $A-B$ via a differential amplifier circuit DA3 in the form of a signal VA−B. The electric charges $(A+A0)+(B+B0)$ and $A0+B0$ which are stored at the electric charge storing parts AL and BL and the electric charge storing parts AD and BD are nondestructively read out via respective floating gates FG1 and FG2. Then, a signal VA+B representing $(A+A0)+(B+B0)-(A0+B0)=A+B$ is produced via a differential amplifier circuit DA4. A signal read-out operation is performed when this output VA+B reaches a reference value. After detection of the signal read-out, a signal $\phi$RS goes to high to clear unnecessary signals.

In this embodiment the light receiving areas are selected through the integration clearing gates. However, the electric charge transfer gates SH1 and SH2 may be divided into parts corresponding to the light receiving areas AS1, BS1, AS2 and BS2, and the light receiving areas may be selected by controlling the divided transfer gates.

Figure 7A:
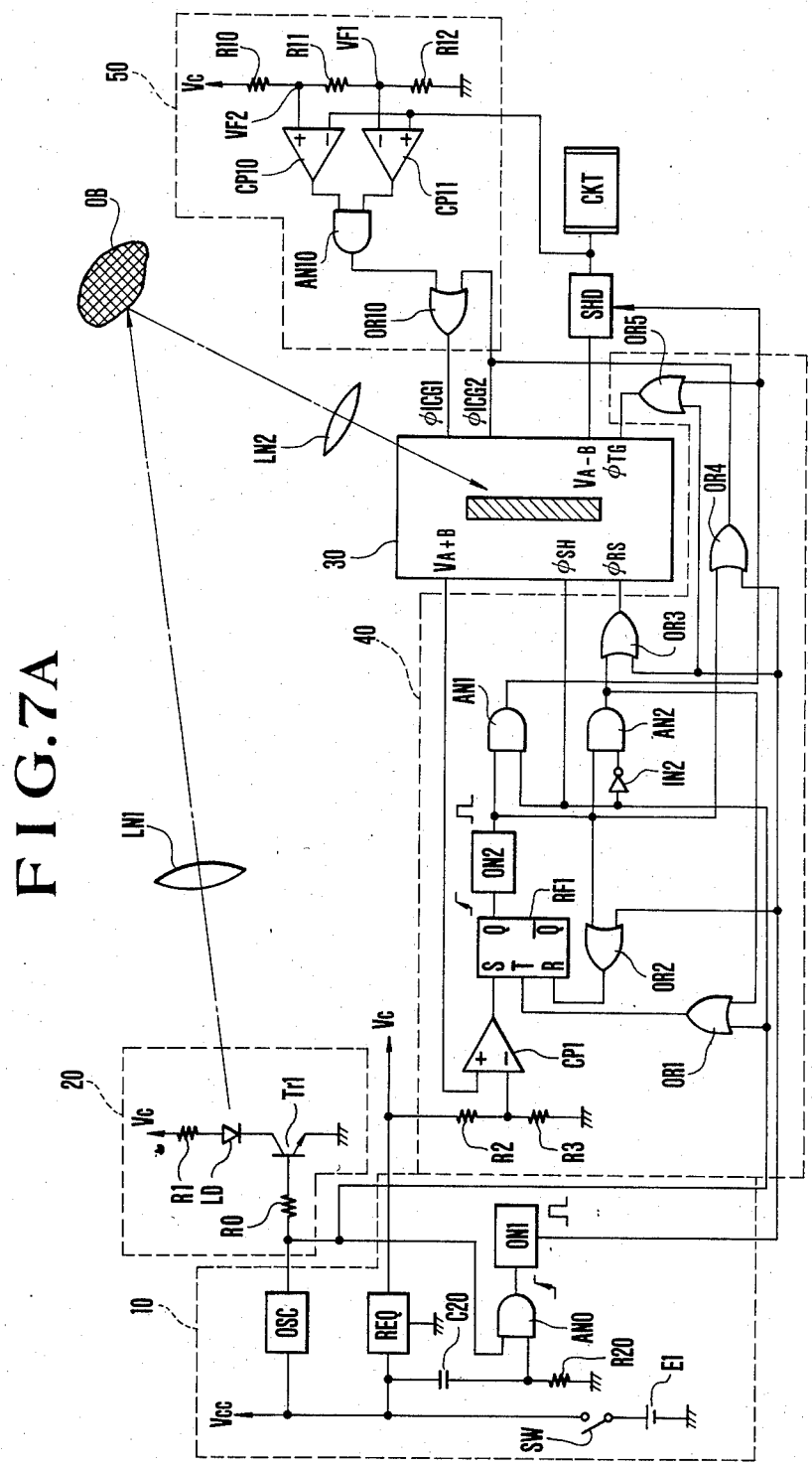
FIG. 7A is a circuit diagram showing an electric circuit for driving the photo-electric converting means.
Figure 8:
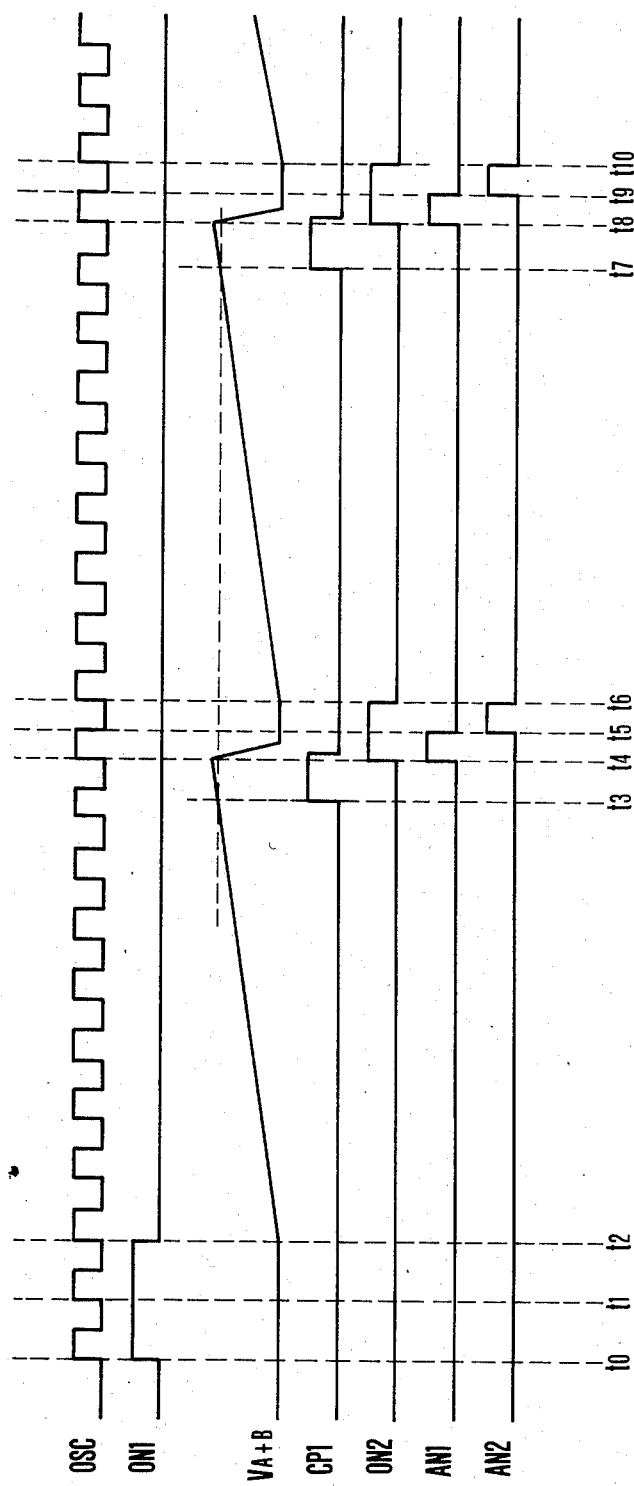

FIG. 7A shows by way of example an electric circuit arrangement for driving the photo-electric converting means of FIG. 6. FIG. 8 is a timing chart showing the signals produced from the essential parts of the electric circuit of FIG. 7A. Referring to these drawings, a block 10 represents a start circuit. The start circuit 10 comprises a power switch SW; a power source E1; a reference voltage generating circuit REQ; a time constant circuit consisting of a capacitor C20 and a resistor R20; a pulse circuit OSC which is arranged to generate reference pulses (OSC in FIG. 8) when the power switch SW closes; an AND gate AN0 which is arranged to receive the pulse signal OSC; and a one-shot circuit ON1 which is arranged to produce a high level signal (ON1 in FIG. 8) for a period of time determined by the above-stated time constant circuit. A block 20 represents a light emission control circuit arranged to cause a light emitting element LD to light up. This circuit 20 comprises resistors R0 and R1, a transistors Tr1, the light emitting element LD, etc. The transistor Tr1 is arranged to turn on and off according to the on-and-off cycle of the pulse circuit OSC. The light emitting element LD then operates to project and not to project a light accordingly. A reference numeral 30 denotes the paired differential light receiving means of FIG. 6. A reference symbol VA+B denotes the output signal of the above-stated differential amplifier DA4; VA−B the output signal of the differential amplifier DA3. Symbols $\phi$ICG1, $\phi$ICG2, $\phi$TG, $\phi$SH and $\phi$RS denote gate pulses shown in FIG. 6 respectively.

A block 40 represents a gate pulse control circuit which controls each of the gate pulses of the light receiving means 30. The gate pulse control circuit 40 comprises a comparator 40A, a set-reset flip-flop RF1, a one-shot circuit ON2, OR gates OR1, OR2, OR3, OR4 and OR5, AND gates AN1 and AN2, an inverter IN2, etc.

A block 50 represents a clear gate control circuit which controls the above-stated clear gate pulses $\phi$ICG1 and $\phi$ICG2. The circuit 50 receives a difference signal VA−B representing a difference between electric charges stored by the above-stated pair of light receiving elements A and B via a sample-and-hold circuit SHD. The circuit 50 controls the clear gate pulse $\phi$ICG1 according to the difference signal VA−B. Then, storing and clearing operations are performed by means of these pulses $\phi$ICG1 and $\phi$ICG2 on the clearing gates IW1, IW2, IY1, IY2, IT1, IT2, IZ1 and IZ2 which are arranged to transfer electric charges from the photo-electric converting parts AS1, AS2, BS1 and BS2 of the light receiving or photo-sensitive elements to the electric charge storing parts AL, BL, AD and BD. A block CKT represents a control circuit which is arranged to receive the signal VA−B from the sample-and-hold circuit SHD and to produce a signal for shifting the position of a focusing lens to an in-focus position. A reference symbol OB denotes a distance measuring object; LN1 denotes a light projection lens; LN2 denotes a light receiving lens. The lens LN2 is arranged to guide a reflection light coming from the object OB to the light receiving means 30.

The embodiment which is arranged as described above operates as follows: Referring to the timing chart of FIG. 8, when the power supply switch SW turns on at a point of time t0 to effect power supply to each parts, the pulse circuit or oscillator OSC begins to oscillate. The constant voltage source REQ produces a reference voltage Vc. At this instant, and in synchronism with a rising pulse of the signal OSC, the output level of the AND gate AN0 changes to a high level and remains at the high level for a brief period of time determined by the capacitor C20 and resistor R20. This causes the one-shot circuit ON1 to produce a one-shot pulse. OR gates OR3, OR4, OR5 and OR10 now impress a high on terminals $\phi$ICG1 and $\phi$ICG2 during a period between time points t0 and t2. Unnecessary electric charges within the storaged type photo-electric converting means are then cleared. Under the initial condition at the time point t0, the sample-and-hold circuit SHD holds nothing there. Therefore, the output level of the sample-and-hold circuit SHD is lower than the reference voltage VF1 determined by resistors R10-R12. The output level of the comparator CP10 changes to a high level and that of the comparator CP11 to a low level. In synchronism with a rising pulse of the signal OSC at the time point t1, the RST flip-flop RF1 is reset. Meanwhile, the high level signal OSC turns on the transistor Tr1. Therefore, a current restricted by the resistor R1 causes the light emitting element LD to light up. This light is projected on the object OB via the projection lens LN1. A reflection light from the object OB is then imaged via the optical system LN2 on the photo-electric converting means. In case that the image of the reflection is formed in the middle part between the light receiving areas AS1 and BS1 of the photo-electric converting parts A1 and B1 shown in FIG. 6, the optical system LN2 forms an image of the object in a predetermined position if the optical system LN2 is a photo-taking lens. However, if not, a photo-taking lens which is separately provided forms the object image in the predetermined position. In other words, the photo-taking lens is in an in-focus position under such a condition. When the output level of the one-shot circuit ON1 becomes low at the point of time t2, the levels of the signals $\phi$ICG1 and $\phi$ICG2 become low. As a result of that, the clear gates IW1, IW2, IY1, IY2, IT1, IT2, IZ1 and IZ2 are closed. At the time of light projection by the light emitting means, the high level signal of the oscillator OSC is supplied to a shift pulse gate $\phi$SH. Then, the level of a shift gate SH1 becomes high to allow the electric charges of the photo-electric converting parts AS1, AS2, BS1 and BS2 to be supplied via the shift gate SH1 to the electric charge storing parts AL and BL. Then, a signal corresponding to the quantity of light received at the time of light projection by the light emitting means is stored at each of the electric charge storing parts. Meanwhile, the electric charges produced when no light is projected from the light emitting means are arranged to become low level signals because the shift pulse $\phi$SH is supplied to the shift gate SH2 via the inverter IN1. Therefore, when a light is projected, the electric charge storing parts AD and BD do not perform any storing operation. When the pulses produced from the oscillator OSC are at a low level, i.e. when no light is projected from the light emitting means 20, the shift pulse $\phi$SH becomes a low level signal and the shift gate SH1 assumes a closed state. Meanwhile, the output level of the shift gate SH2 is caused to become high through the inverter IN1. The high level signal of the shift gate SH2 then causes the electric charges of the photo-electric converting parts AS1, AS2, BS1 and BS2 to be stored at the electric charge storing parts AD and BD. As described above, during a period from the time point t2 to another time point t3, the light emitting means 20 projects and stops projecting light in synchronism with the oscillation of the oscillator OSC. Then, the electric charge storing parts AL, BL, AD and BD alternately perform an electric charge storing operation when light is projected and another electric charge storing operation when no light is projected.

When the signal VA+B, at the time point t3, exceeds a reference voltage determined by the resistors R2 and R3, the output level of the comparator CP1 changes to a high level. Therefore, at a point of time t4, the RST flip-flop RF1 is set in synchronism with the rise of the pulse of the signal OSC. The one-shot circuit ON2 then produces a one-shot pulse to make the levels of the signals $\phi$ICG1 and $\phi$ICG2 high to bring to an end the image information storing operation on the storage type photo-electric converting means. Upon completion of it, the level of the signal $\phi$TG is caused to become high via the AND gate AN1 and the OR gate OR5. With the signal $\phi$TG becoming a high level signal, the stored information is read out. Then, the information or signal VA−B is sampled and held at the sample-and-hold circuit SHD during a period of time between time points t4 and t5. If the information VA−B thus sampled and held is between two reference voltages VF1 and VF2, the photo-taking lens is in the proximity of an in-focus position. In that event, the S/N ratio of a next distance measuring or detecting operation can be improved by detecting the distance on the basis of the electric charges produced from the photo-electric converting parts AS1 and BS1 which are located in the middle of the photo-electric converting means. In other words, with the output of the circuit SHD between the reference voltage values VF1 and VF2, the output levels of the comparators OP10 and CP11 become high to make the output level of the AND gate AN10 high. Then, a high level signal comes via the OR gate OR10 to $\phi$ICG1 and the electric charges produced by the photo-electric converting parts AS2 and BS2 are cleared until completion of a next electric charge storing process. During a period between the time points t5 and 56, the level of $\phi$RS is caused to become high via the AND gate AN2, the inverter IN2 and the OR gate OR3. Therefore, the unnecessary electric charges which are produced from the light receiving areas AS1 and BS1 and are stored at the electric charge-to-voltage converting part are cleared and a new image information producing and storing process begins at the point of time t6. Further, the RST flip-flop RF1 is arranged to be reset by the output of the AND gate AN2 at the time point t5. During a period between time points t6 and t10, an image information detecting process is performed in the same manner as the process carried out during the period between the time points t0 and t6. Then, new image information is sampled and held during a period between the time points t8 and t9. The information thus sampled and held is discriminated and again the light receiving areas are shifted accordingly. The control circuit CKT utilizes the information sampled and held at the circuit SHD for driving and shifting the photo-taking lens to an in-focus position. The factors on which the light receiving areas of the photo-electric converting means are to be switched over from one to another include the focal length, F-number and zoom ratio of the photo-taking lens, etc. The shifting extent of the reflection light image on the light receiving areas corresponding to the object distance varies according to these factors. Therefore, the embodiment is advantageous in switch over the light receiving areas either manually or automatically to obtain the optimum state of the sensor for distance detection.

With the differential type light receiving device according to the invention used for a distance detecting system as mentioned in the foregoing, the adverse effect of the ambient light can be eliminated to give a distance detection signal of a good S/N ratio. This is an advantageous feature of the embodiment.

The control circuit CKT mentioned above is arranged as shown in FIG. 7B. Referring to FIG. 7B, a block 110 represents a window comparator which is arranged to be operated with the above-stated signal VA−B. Another block 120 represents a motor driving circuit. A reference symbol M denotes a motor. The motor M is connected to a lens carrying member which carries a focusing lens. In the circuit of FIG. 7B, an in-focus state is considered to have been attained when the value of the signal VA−B is between the values VR1 and VR2 shown in FIG. 5(c). In the event of VA−B>VR1, the position of the focusing lens is shifted toward the in-focus zone, for example, by rotating the motor to the right. In the event of VA−B<VR2, the lens is shifted by rotating the motor to the left. With the value of the signal VA−B between the values VR1 and VR2, outputs of the comparators CP10 and CP11 become high level signals to turn on only transistors Tr11 and Tr13. Then, the motor does not rotate and the lens stays within the in-focus zone. In the event of VA−B>VR1, the output of the comparator CP10 becomes a low level signal and that of the other comparator CP11 a high level signal. Transistors Tr10 and Tr13 turn on. A current flows in the direction of IA as shown in FIG. 7B to drive the motor M accordingly. In the event of VA−B<VR2, the output or the comparator CP10 becomes a high level signal and that of the comparator CP11 a low level signal. Then, transistors Tr11 and Tr12 turn on. A current flows in the direction of IB to drive the motor M accordingly.

Figure 9:
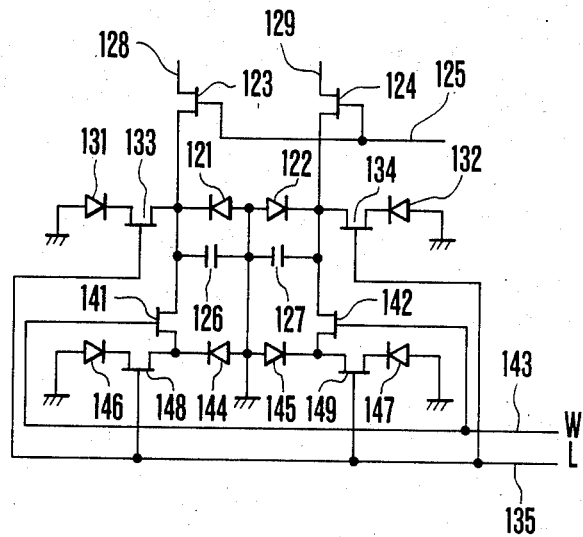
FIGS. 9–11 are illustrations of a second embodiment of the invention. Of these drawings.
Figure 10:
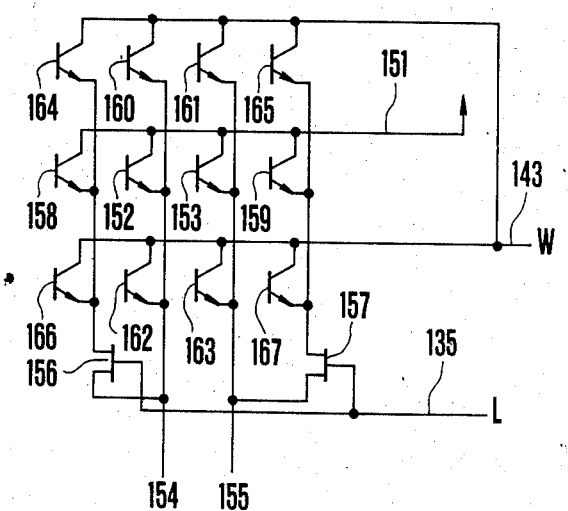
Figure 11:
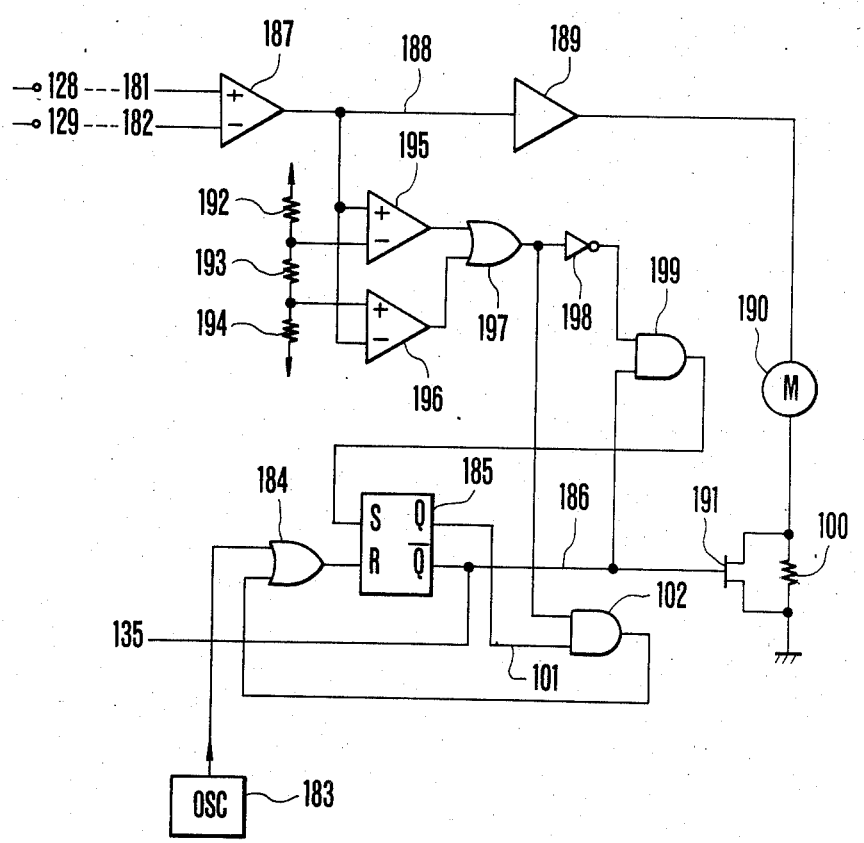

FIGS. 9, 10 and 11 show a differential type light receiving device arranged as a second embodiment of the invention. The second embodiment is arranged to solve the problem which is mentioned in the foregoing as the second subject matter of the invention. The embodiment includes photo-electric converting elements 121 and 122 which form a first photo-electric converting part. The first photo-electric converting part has a small light receiving area and is arranged to receive a reflection light resulting from light projection performed by light emitting means. Electric charge storing parts 126 and 127 are arranged to store electric charges produced at the above-stated photo-electric converting elements 121 and 122. Gate parts 123 and 124 are arranged to let the stored electric charges out of the electric charge storing parts 126 and 127. These gate parts are provided with gate terminals 128 and 129 respectively. A gate control signal input terminal 125 is provided for the purpose of controlling the gate parts 123 and 124. Photo-electric converting elements 131 and 132 are respectively connected via gates 133 and 134 to the electric charge storing parts 126 and 127. These elements 131 and 132 are arranged to detect the deviating direction of an imaging point relative to an in-focus point.

Photo-electric converting elements 144, 145, 146 and 147 are arranged to receive a reflection light coming from the object as a result of light projection performed by light emitting means when the object stays far away from the in-focus position. They are connected to the above-stated electric charge storing parts 126 and 127 via gates 141 and 142 respectively. Control signal lines 135 and 143 are arranged to render the gates 133, 134, 141 and 142 conductive or nonconductive and thus to control the operation of the photo-electric converting elements 131, 132 and 144–147 according to the high or low levels of their signals.

In the case of the differential type light receiving device of FIG. 9, the above-stated control signal lines 135 and 143 are arranged to be responsive to an operation switch which is disposed within a lens barrel. When the photo-taking lens is shifted to the nearest distance or infinity distance position or a predetermined position, opening and closing of the operation switch are controlled in such a manner that high or low level signals are produced to these signal lines 135 and 143 to switch over thereby light receiving regions from one to another.

This switch-over operation may be effected through the shift of the lens position according to the object distance.

In FIG. 9, a visual field and a deviation detecting range are arranged to be variable either manually or in response to a shift of the position of the photo-taking lens. However, instead of such switch-over arrangement, the switch-over operation can be automatically accomplished.

For example, FIG. 11 shows an example of such automatic switch-over or change-over arrangement. In the case of FIG. 11, an RS flip-flop 185 is arranged to be reset via an OR gate 184 by a reset pulse signal produced from an oscillator 183 at predetermined time intervals. With the flip-flop 185 reset, the level of the $\bar{Q}$ output of the flip-flop 185 becomes high and the line 186 of the $\bar{Q}$ output causes the level of the wide range selection line 135 of FIGS. 9 and 10 to become high. Then, two photo-electric conversion outputs obtained under a wide range condition are produced, for example, from the gate terminals 128 and 129. These outputs are received by terminals 181 and 182 of FIG. 11. A difference between the two photo-electric conversion outputs is then applied via a differential amplifier 187 to a line 188. This output is supplied to an amplifier 189 and is used for automatic focusing which is accomplished by a motor 190. Since the level of the line 186 is high, a gate 191 is open to permit the motor to make adjustment to an in-focus point at a high speed for a low sensitivity output. Resistors 192–194 and comparators 195 and 196 form a window comparator. When the level of the line 188 reaches a level within a range set by this window comparator, i.e. when the lens comes close to an in-focus position, the output levels of the two comparators become low. This results in a low output level of an OR gate 197. The low level output of the OR gate 197 makes the output level of an invert gate 198 high. Then, in conjunction with the high level of the line 186, the high level output of the invert gate 198 causes an AND gate 199 to produce a high level output. The high level output of the AND gate 199 then comes to set the RS flip-flop 185. With the flip-flop 185 set, the levels of lines 186 and 135 of the $\bar{Q}$ output of the flip-flop 185 become low to bring about a narrow range and a high accuracy operation mode. Then, a difference output obtained from these two lines causes the motor 190 to perform a fine focusing adjustment at a low speed via a resistor 100 instead of a gate 191 which is closed.

In the event of sudden movement of the object forward or backward during the process of the above-stated fine focusing adjustment, one of the comparators 195 and 196 (which are assumed to be two identical window comparators for the sake of description) comes to produce a high level output. Then, the output level of the OR gate 197 becomes high. As a result, the high level output of the OR gate 197 and a high level output from a terminal Q of the RS flip-flop 185 are supplied to the AND gate 102. The output level of the gate 102 becomes high and comes via an OR gate 184 to reset the RS flip-flop 185 and thus bring the operation back to the wide range mode.

The range and the sensitivity of the embodiment thus can be automatically switched over in the manner as described above. In the examples given in the foregoing, the switch-over operation is arranged to be performed on the photo-electric converting elements. However, it goes without saying that the switch-over arrangment may be replaced with some different arrangement wherein, for example, when the lens is shifted to an infinity distance position, the range of only the light receiving part corresponding to near distances may be broadened in such a way as to have the photo-electric conversion outputs corresponding to ineffective object distances either not selected or cleared and thus to always limit the operation range to effective distances. Such arrangement likewise prevents error actions due to erroneous or noise signals resulting from irregular reflection within the lens. In the case of focus detecting zone arrangement using a larger number of photo-electric converting elements than two elements, the same advantageous effect of course can be obtained by shifting or switching over the zones or distance measuring ranges (areas).

In accordance with this invention, as described in the foregoing, photo-electric converting elements of the photo-electric converting means are appropriately selected to give an accurate detection signal of a high S/N ratio. Further, application of the invention to the photo-electric converting device for automatic focusing of cameras or the like permits a satisfactory automatic focusing operation to be performed on the lens.

What we claim is:

1. A device, comprising:
   light projection means for projecting a detection light onto an object;
   photosensing means having a first section having a plurality of sensing areas and a second section having a plurality of sensing areas arranged side by side with the sensing areas of said first section;
   optical means for converging the detection light reflected by an object onto said photosensing means; and
   detection means for detecting a distance on the basis of outputs of said first and second sections of said photosensing means in a first mode, and for detecting the distance on the basis of an output of a predetermined sensing area of said plurality of sensing areas of said first section and an output of a sensing area of said second section corresponding to said predetermined sensing area in a second mode.

2. A device according to claim 1, wherein said detection means detects the distance in the first mode, and changes to the second mode when the output of said first section and the output of said second section satisfy a predetermined relationship, and the sensing areas used in the second mode are a sensing area of said first section closer to said second section and a sensing area of said second section closer to said first section.

3. A device according to claim 2, wherein said predetermined relationship is that the difference between the output of said first section and the output of said second section is less than a predetermined value.

4. A device according to claim 1, wherein said photosensing light projection means intermittently projects the light, and said photosensing means is an accumulation type photo-electric conversion device which stores signals at the time of light projection and stores signals at the time of non-light projection, respectively.

5. A device according to claim 1, wherein said light projection means includes a photographic zoom lens, and said detection means selects the second mode when said photographic zoom lens is set at a predetermined zoom position.

6. A device, comprising:
   light projection means for projecting a detection light onto an object;
   photosensing means having a first section having a plurality of sensing areas and a second section having a plurality of sensing areas arranged side by side with the sensing areas of said first section;
   optical means for converging the detection light reflected by the object onto said photosensing means; and
   detection means for detecting a distance on the basis of outputs of said first and second sections of said photosensing means and, when the output of said first section and the output of said second section satisfy a predetermined relationship, detecting the distance on the basis of an output of one of said sensing areas of said second section which is located nearer said first section.

7. A device for focus adjustment of a photographic lens, comprising:
   light projection means for projecting a detection light onto an object;
   photosensing means having a plurality of pairs of sensing areas, arranged symmetrically relative to a standard line, for sensing the detection light reflected by the object; and
   signal forming means for forming a signal for focus adjustment of said photographic lens, said signal forming means forming the signal on the basis of signals from the plurality of pairs of sensing areas in a first mode, and on the basis of signals from sensing areas other than predetermined pairs of sensing areas in a second mode.

8. A device according to claim 7, wherein said signal forming means forms the signal in the first mode, and changes to the second mode, when the signals from the plurality of pairs of sensing areas reach a predetermined state, to form the signal on the basis of signals from an inner pair of sensing areas.

* * * * *